United States Patent [19]

Stewart, Jr. et al.

[11] Patent Number: 5,755,465

[45] Date of Patent: May 26, 1998

[54] HEAT RECOVERABLE ARTICLE AND METHOD FOR SEALING SPLICES

[75] Inventors: John B. Stewart, Jr., Saratoga; Ronald W. Watson, Half Moon Bay, both of Calif.

[73] Assignee: Raychem Corporation, Menlo Park, Calif.

[21] Appl. No.: 551,638

[22] Filed: Nov. 1, 1995

[51] Int. Cl.$^6$ .................. F16L 47/00; H02G 15/18
[52] U.S. Cl. ............... 285/381.5; 285/915; 174/DIG. 8; 156/86; 439/932
[58] Field of Search .................. 285/381.4, 381.5, 285/915; 174/DIG. 8; 156/84, 85, 86, 503; 29/447; 439/932

[56] References Cited

U.S. PATENT DOCUMENTS

| | | | |
|---|---|---|---|
| 4,129,932 | 12/1978 | Stancati | 29/407 |
| 4,245,674 | 1/1981 | Nakamura et al. | 174/DIG. 8 |
| 4,472,468 | 9/1984 | Tailor et al. | 174/DIG. 8 |
| 4,728,550 | 3/1988 | Van Beersel et al. | 174/DIG. 8 |
| 4,804,338 | 2/1989 | Dibble et al. | 439/583 |
| 4,896,904 | 1/1990 | Gadsden et al. | 285/381.5 |
| 4,915,990 | 4/1990 | Chang | 174/DIG. 8 |
| 5,175,032 | 12/1992 | Steele et al. | 174/DIG. 8 |
| 5,411,777 | 5/1995 | Steele et al. | 174/DIG. 8 |
| 5,482,087 | 1/1996 | Overbergh et al. | 174/DIG. 8 |

FOREIGN PATENT DOCUMENTS

| | | |
|---|---|---|
| 0 052 241 A2 | 10/1981 | European Pat. Off. . |
| 0 193 834 A1 | 2/1986 | European Pat. Off. . |
| 3720577 A1 | 2/1988 | Germany . |
| WO 91/13756 | 9/1991 | United Kingdom . |

*Primary Examiner*—Eric K. Nicholson
*Attorney, Agent, or Firm*—Sheri M. Novack; Herbert G. Burkard

[57] ABSTRACT

A heat recoverable article for sealing splices having substrates of disparate size. The heat recoverable article includes a first heat shrinkable sleeve having an adhesive which extends over at least part of its interior surface and a second heat shrinkable sleeve which overlaps an end of the first sleeve. The second sleeve begins to recover before the first sleeve and holds the first sleeve in place as recovery continues, eliminating milk off.

18 Claims, 1 Drawing Sheet

HEAT RECOVERABLE ARTICLE AND METHOD FOR SEALING SPLICES

BACKGROUND OF THE INVENTION

It is often difficult to seal splices connecting a larger sized equivalent diameter substrate with a smaller one. When attempting to seal splices using a piece of adhesive coated tubing recovered over a substrate or splice which narrows or changes from a larger to a smaller equivalent diameter, the tubing tends to slide in the direction of the smaller equivalent diameter. This is a function of the recovery temperature of the tubing, the melting temperature of the adhesive, the viscosity and lubricity of the adhesive at the recovery temperature and hoop stress of the tubing at the recovery temperature. This sliding phenomenon is called "milk off" and can be so severe that the tubing slides off the substrate leaving it completely uncovered. Milk off limits the range of use of heat recoverable adhesive coated tubing, because it limits the dimensions the tubing and substrates can have in certain applications. The substrates must be reconfigured so as to balance the sides of the splice. This problem is particularly troublesome in the automotive field when attempting to seal splices in which one side of the splice contains a large number of wires spliced to a single wire on the opposite side of the splice.

SUMMARY OF THE INVENTION

We have discovered a heat recoverable article which reduces or eliminates milk off.

The first aspect of the invention comprises a heat recoverable tubular article comprising:

a first heat-shrinkable polymeric sleeve which has a first recovery temperature $T_1$ and which comprises a first open end, a second open end, and a body between the first and second ends, the body having an interior surface and an exterior surface;

a layer of hot-melt adhesive which is coated on at least part of the interior surface of the first sleeve and which has a melting point less than $T_1$;

second heat-shrinkable polymeric sleeve which (a) has a second recovery temperature $T_2$ which does not exceed $T_1$; (b) overlies a first end portion of the first sleeve; and (c) extends outwardly beyond the first end portion of the first sleeve.

An additional aspect of the invention comprises a method for sealing a splice between a first smaller elongate substrate having a first equivalent diameter and a second, larger elongate substrate having a second equivalent diameter, wherein the second equivalent diameter is greater than the first equivalent diameter, said method comprising the steps of:

providing a heat recoverable tubular article as defined in the first aspect of the invention;

placing the tubular article around the substrates so that the first sleeve overlies the first and second substrates and the second sleeve overlies the first end of the first sleeve and the second substrate; and heating the first and second sleeves to thereby recover the sleeves around the splice.

A third aspect of the invention comprises a heat recoverable tubular article comprising:

a first heat-shrinkable polymeric sleeve which has a first recovery temperature $T_1$ between 70° and 250° C. and which comprises a first open end, a second open end, and a body between the first and second ends, the body having an interior surface and an exterior surface;

a layer of hot-melt adhesive which is coated on the entire interior surface of the first sleeve and which has a melting point between 65° and 150° C and less than $T_1$; and a second heat-shrinkable polymeric sleeve which (a) has a second recovery temperature $T_2$ which is equal to $T_1$; (b) overlies a first end portion of the first sleeve so as to form a friction fit around the first end portion of the sleeve; and (c) extends outwardly beyond the first end portion of the first sleeve.

A fourth aspect of the invention comprises a method for sealing a splice between a first, smaller elongate substrate having between 1 and 3 wires and having a first equivalent diameter, and a second, larger elongate substrate having between 1 and 11 wires and having a second equivalent diameter, wherein the second equivalent diameter is greater than the first equivalent diameter, said method comprising the steps of:

providing a heat recoverable tubular article as defined in the third aspect of the invention;

placing the tubular article around the substrates so that the first sleeve overlies the first and second substrates and the second sleeve overlies the first end of the first sleeve and the second substrate; and heating the first and second sleeves at the same time in a single heating operation to thereby recover the sleeves around the splice.

DETAILED DESCRIPTION OF THE INVENTION

Figure 1:
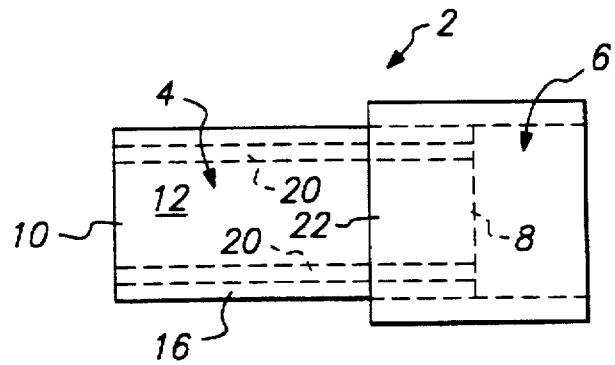
FIG. 1 is a cross sectional view of the article of the present invention.
Figure 2:
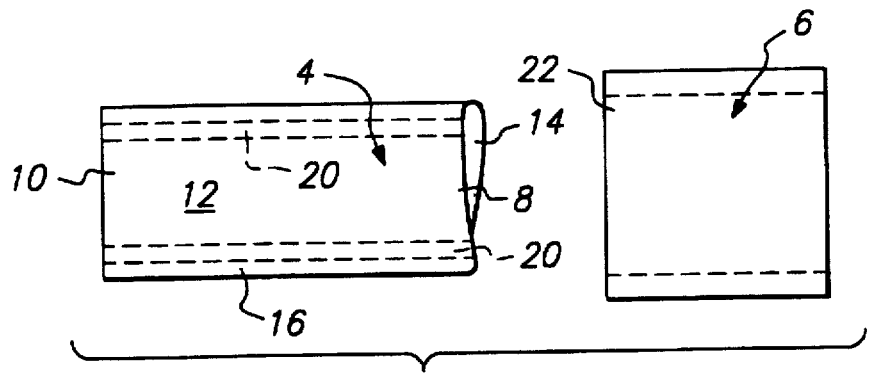
FIG. 2 is an exploded cross sectional view of the article of the present invention.

Referring now to the drawings, FIGS. 1 and 2 illustrate a heat recoverable tubular article 2 including a first sleeve 4 and a second sleeve 6.

First sleeve 4 is a heat shrinkable polymeric sleeve which includes a first open end 8, a second open end 10 and a body 12 disposed between first and second ends 8, 10. Body 12 has an interior surface 14 and an exterior surface 16.

Heat recoverable articles are well known. They are articles the dimensional configuration of which may be made substantially to change when subjected to heat treatment. Usually these articles recover, on heating, towards an original shape from which they have previously been deformed but the term "heat recoverable," as used herein, also includes an article, which, on heating, adopts a new configuration, even if it has not been previously deformed.

First sleeve 4 has a recovery temperature $T_1$ at which the sleeve recovers towards its original shape. First sleeve 4 is a dual wall tube having a first wall comprising the heat shrinkable polymeric material and the inner wall comprising a layer of adhesive 20. Adhesive 20 is a hot-melt adhesive having a melting point less than $T_1$ and extending over at least part of interior surface 14. The adhesive preferably coats at least a portion of the interior surface, and more preferably the entire interior surface.

Second sleeve 6 is a heat shrinkable polymeric sleeve which includes an end 22. Second sleeve 6 has a recovery temperature $T_2$ which does not exceed $T_1$ and is, preferably, less than $T_1$, as described below. The second sleeve is preferably a single wall tubing which includes no adhesive layer coating the interior surface.

Second sleeve 6 extends outwardly beyond first end 8 of the first sleeve, overlapping the first end. End 22 and first end 8 are sized so that end 22 fits around first end 8. In the preferred embodiment, end 22 is not substantially greater than first end 8. More preferred is that end 22 is substantially the same size as or only slightly larger than first end 8. In this case, the most preferred embodiment, end 22 is a friction fit around first end 8. This enables tubular article 2 to be handled as one piece.

First and second sleeves 4, 6 may be constructed of the same heat shrinkable polymeric materials. An uncoated sleeve, such as second sleeve 6, constructed of this material begins to recover when heated prior to first sleeve 4, which is coated with adhesive, because the second sleeve has a smaller mass of material to heat. It is within the scope of the present invention that the material of the second sleeve be made of any other tubing in which its recovery temperature $T_2$ does not exceed $T_1$ or in which $T_1$ is no greater than 150° C. more than $T_2$.

First sleeve 4 may be constructed of any polymeric material, for example, a polyethylene copolymer tubing, polyethylene homopolymer or any fluoropolymer. Similarly, second sleeve 6 may be constructed of any polymeric material, for example, a polyethylene copolymer tubing, polyethylene homopolymer or any fluoropolymer, so long as the relationship of recovery temperatures $T_1$ and $T_2$ are as described above.

Adhesive 20 is preferably a polyamide. Other materials such as EVA based hot-melt can also be used in this invention, or any other adhesive which is a hot-melt adhesive.

One advantage of constructing tubular article 2 of two separate sleeves is that the separate sleeves may be produced in a continuous operation. In this way, first sleeve 4 may be produced as continuous tubing, coated with adhesive on the entire interior surface, and then cut to size. Similarly, second sleeve 6 may be produced as continuous tubing, entirely uncoated by adhesive, and then cut to size. This is much more cost-effective than providing a single tubular article incorporating one portion coated with adhesive and a separate uncoated portion.

Figure 3:
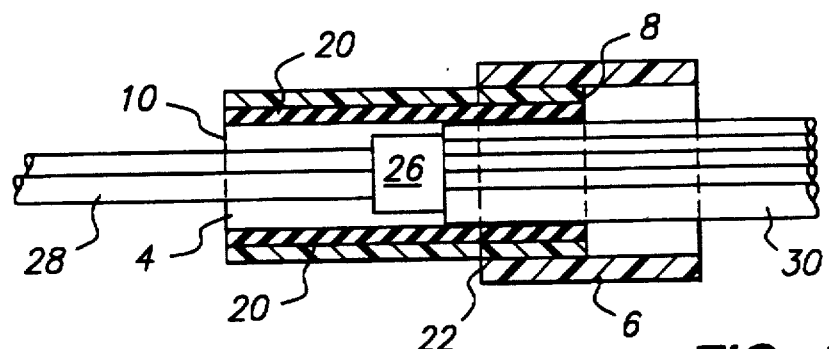
FIG. 3 is a cross sectional elevational view of the article of the present invention after placement around a splice, and before recovery.
Figure 4:
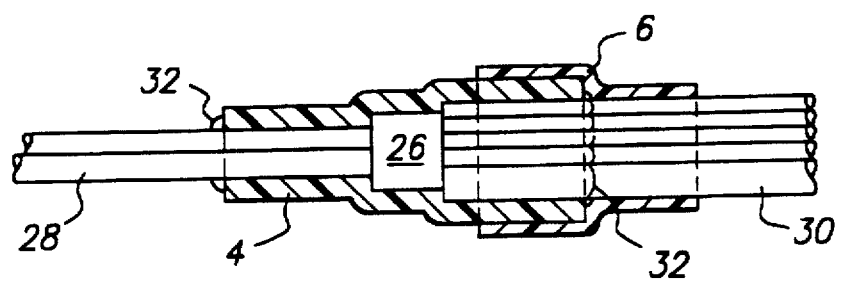
FIG. 4 is a cross sectional elevational view of the heat recoverable article of the present invention after recovery around a splice.

In operation, tubular article 2 is employed to seal a splice 26 between a first elongate substrate 28 having a first equivalent diameter and a second elongate substrate 30 having a second equivalent diameter. Equivalent diameter is defined as the diameter of a circle whose area is equal to the cross-sectional area of the substrate. As shown in FIGS. 3 and 4, the second equivalent diameter is greater than the first diameter. In the most preferred application, the first substrate is a small bundle of wires or a single wire, while the second substrate is a larger bundle of wires. Tubular article 2 may be placed around splice 26 as one piece when the sleeves are joined by a friction fit as described above, or each sleeve 4, 6 of the article may be placed around the splice individually. For clarity, placement of each of the sleeves around the substrates will first be described separately.

First sleeve 4 is placed around the substrate such that body 12 overlies both first and second substrates 28, 30. First sleeve 4 is positioned such that second end 10 overlies first substrate 28 and first end 8 overlies second substrate 30. Second sleeve 6 is then placed around second substrate 30 such that end 22 of the second sleeve overlies first end 8 of the first sleeve.

Alternatively, first and second sleeves 4, 6 may be placed around the substrates as one piece, held together by a friction fit, such that they are positioned in place around the substrates as described above in connection with placing the sleeves separately.

Tubular article 2 is heated such that first and second sleeves 4, 6 are heated at the same time, preferably in a single heating operation. Second sleeve 6 begins to recover before the first sleeve or its adhesive, for the reasons described above, thereby holding the first sleeve in place around the splice before milk off can begin. As the tubular article continues heating, adhesive 20 begins to melt and first sleeve 4 begins to recover. Milk off is prevented because, before the adhesive can begin to flow, the second sleeve is maintaining the desired positioning of the first sleeve. Rather than resulting in milk off, the adhesive is driven down onto the substrate of smaller diameter allowing a smaller quantity of adhesive to be employed. Sleeves 4, 6 recover to their original shape around the splice in a single heating operation. As seen in FIG. 4, in the recovered state, adhesive may flow slightly beyond sleeves 4, 6 as shown by numeral 32.

One application of tubular article 2 is in the automotive field. In this application, between 1 and 14 wires form the first, smaller elongate substrate, preferably between 1 and 11 wires, more preferably between 1 and 7 wires, and especially between 1 and 3 wires. Each of these wires may be the same or different and each has a gauge size of between 22 and 2, preferably between 20 and 4, and more preferably between 20 and 6. The insulation on each wire may be cross-linked polyethylene, PVC, polypropylene, polyester or any polymeric wire jacket.

The second, larger elongate substrate is made up of between 1 and 15 wires, preferably between 1 and 12 wires, and more preferably between 1 and 7 wires. Each of these wires may be the same or different and each has a gauge size of between 22 and 2, preferably between 20 and 4, and more preferably between 20 and 6. The insulation on each wire may be cross-linked polyethylene, PVC, polypropylene, polyester or any polymeric wire jacket.

The first sleeve is a 1 to 4" section of polyethylene copolymer tubing coated with an adhesive which forms a dual wall coextruded tubing. The material of the first sleeve may be a polyethylene homopolymer or any fluoropolymer. The recovery temperature $T_1$ of the first sleeve is between 60° and 300° C., preferably between 70° and 250° C. and more preferably between 70° and 140° C. The diameter of the first sleeve is between 1/16" and 2", preferably between 1/16" and 1½", and more preferably between 1/8" and 1¼", and is recovered between 20 and 90%, preferably between 50 and 85%, and more preferably between 50 and 80%. The material of the adhesive may be a polyamide or an EVA based hot-melt.

The recovery temperature of the adhesive is slightly less than $T_1$, preferably between 50° and 250° C., more preferably between 65° and 150° C. and especially between 65° and 130° C.

The second sleeve is a 1 to 1½" section of single wall polyethylene copolymer tubing having a recovery temperature $T_2$ which is equal to $T_1$, slightly less than $T_1$ or preferably within 150° C. less than $T_1$. The material of the second sleeve may be a polyethylene homopolymer or a fluoropolymer. The diameter of the second sleeve is between 1/16" and 2", preferably between 1/16" and 1½", and more preferably between 1/8" and 1¼", and is recovered between 20 and 90%, preferably between 50 and 85%, and more preferably between 50 and 80%.

It should be noted that while the first and second sleeves are described as sleeves, it is within the scope of the present invention to construct one or both sleeves as a wrap around sleeve, a tape, or any other construction. It is also to be understood that this invention could be employed in any application having differential equivalent diameters. Variations and modifications can be made to the present invention without departing from the scope of the present invention, which is limited only by the following claims.

We claim:

1. A heat recoverable tubular article comprising:
   a first heat-shrinkable polymeric sleeve which has a first recovery temperature $T_1$ and which comprises a first open end, a second open end, and a body between the first and second ends, the body having an interior surface and an exterior surface;
   a layer of hot-melt adhesive which is coated on at least part of the interior surface of the first sleeve and which has a melting point less than T1;
   a second heat-shrinkable polymeric sleeve which (a) has a second recovery temperature $T_2$ which does not exceed $T_1$; (b) overlies a first end portion of the first sleeve; and (c) extends outwardly beyond the first end portion of the first sleeve.

2. The article as defined in claim I wherein said layer of hot-melt adhesive is coated on the entire interior surface of the first sleeve.

3. The article as defined in claim 1 wherein said second sleeve comprises a single wall tubing.

4. The article as defined in claim 1 wherein the second sleeve overlaps the first end of the first sleeve.

5. The article as defined in claim 1 wherein an end portion of the second sleeve is a friction fit around the first end portion of the first sleeve.

6. The article as defined in claim 1 wherein said first and second sleeves are heat recovered in a single heating operation.

7. The article as defined in claim 1 wherein $T_1$ is equal to $T_2$.

8. The article as defined in claim 1 wherein $T_1$ is not more than 150° C greater than $T_2$.

9. A method for sealing a splice between a first, smaller elongate substrate having a first equivalent diameter and a second, larger elongate substrate having a second equivalent diameter, wherein the second equivalent diameter is greater than the first equivalent diameter, said method comprising the steps of:
   providing a heat recoverable tubular article comprising:
      a first heat-shrinkable polymeric sleeve which has a first recovery temperature $T_1$ and which comprises a first open end, a second open end, and a body between the first and second ends, the body having an interior surface and an exterior surface;
      a layer of hot-melt adhesive which is coated on at least part of the interior surface of the first sleeve and which has a melting point less than $T_1$; and
      a second heat-shrinkable polymeric sleeve which (a) has a second recovery temperature $T_2$ which does not exceed $T_1$; (b) overlies a first end portion of the first sleeve and (c) extends outwardly beyond the first end of the first sleeve;
   placing the tubular article around the substrates so that the first sleeve overlies the first and second substrates and the second sleeve overlies the first end of the first sleeve and the second substrate; and
   heating the first and second sleeves to thereby recover the sleeves around the splice.

10. The method as defined in claim 9 wherein $T_1$ is equal to $T_2$.

11. The method as defined in claim 9 wherein $T_1$ is not more than 150° C. greater than $T_2$.

12. The method as defined in claim 9 wherein the step of heating said first and second sleeves comprises heating the first and second sleeves at the same time in a single heating operation.

13. The method as defined in claim 9 wherein the step of placing the tubular article comprises placing said second sleeve such that it is spaced from the second end of said first sleeve.

14. The method as defined in claim 9 wherein an end portion of the second sleeve is a friction fit around the first end portion of the first sleeve.

15. The method as defined in claim 9 wherein the layer of adhesive extends over the entire interior surface of the first sleeve.

16. The method as defined in claim 15 wherein the second sleeve comprises a single wall tubing.

17. A heat recoverable tubular article comprising:
   a first heat-shrinkable polymeric sleeve which has a first recovery temperature $T_1$ between 70° and 250° C. and which comprises a first open end, a second open end, and a body between the first and second ends, the body having an interior surface and an exterior surface;
   a layer of hot-melt adhesive which is coated on the entire interior surface of the first sleeve and which has a melting point between 65° and 150° C and less than $T_1$; and
   a second heat-shrinkable polymeric sleeve which (a) has a second recovery temperature $T_2$ which does not exceed $T_1$; (b) overlies a first end portion of the first sleeve so as to form a friction fit around the first end portion of the sleeve; and (c) extends outwardly beyond the first end portion of the first sleeve.

18. A method for sealing a splice between a first, smaller elongate substrate having between 1 and 3 wires and having a first equivalent diameter, and a second, larger elongate substrate having between 1 and 11 wires and having a second equivalent diameter, wherein the second equivalent diameter is greater than the first equivalent diameter, said method comprising the steps of:
   providing a heat recoverable tubular article comprising:
      a first heat-shrinkable polymeric sleeve which has a first recovery temperature $T_1$ between 70° and 250° C. and which comprises a first open end, a second open end, and a body between the first and second ends, the body having an interior surface and an exterior surface;
      a layer of hot-melt adhesive which is coated on the entire interior surface of the first sleeve and which has a melting point between 65° and 150° C. and less than $T_1$; and
      a second heat-shrinkable polymeric sleeve which (a) has a second recovery temperature $T_2$ which does not exceed $T_1$; (b) overlies a first end portion of the first sleeve so as to form a friction fit around the first end portion of the sleeve; and (c) extends outwardly beyond the first end portion of the first sleeve
   placing the tubular article around the substrates so that the first sleeve overlies the first and second substrates and the second sleeve overlies the first end of the first sleeve and the second substrate; and
   heating the first and second sleeves at the same time in a single heating operation to thereby recover the sleeves around the splice.

* * * * *